United States Patent
Pang et al.

(10) Patent No.: US 10,136,369 B2
(45) Date of Patent: Nov. 20, 2018

(54) METHOD, APPARATUS, AND SYSTEM FOR BIASING ADJUSTMENT OF CELL RANGE EXPANSION

(71) Applicant: Alcatel Lucent, Boulogne Billancourt (FR)

(72) Inventors: Jiyong Pang, Shanghai (CN); Qi Jiang, Shanghai (CN); Gang Shen, Shanghai (CN); Dongyao Wang, Shanghai (CN)

(73) Assignee: ALCATEL LUCENT, Boulogne Billancourt (FR)

( * ) Notice: Subject to any disclaimer, the term of this patent is extended or adjusted under 35 U.S.C. 154(b) by 111 days.

(21) Appl. No.: 14/780,809

(22) PCT Filed: Mar. 26, 2014

(86) PCT No.: PCT/IB2014/000572
§ 371 (c)(1),
(2) Date: Sep. 28, 2015

(87) PCT Pub. No.: WO2014/155197
PCT Pub. Date: Oct. 2, 2014

(65) Prior Publication Data
US 2016/0057666 A1     Feb. 25, 2016

(30) Foreign Application Priority Data
Mar. 29, 2013  (CN) .......................... 2013 1 0109289

(51) Int. Cl.
*H04W 36/00* (2009.01)
*H04W 24/10* (2009.01)
*H04W 48/16* (2009.01)

(52) U.S. Cl.
CPC ....... *H04W 36/0083* (2013.01); *H04W 24/10* (2013.01)

(58) Field of Classification Search
CPC ......... H04W 36/0083; H04W 36/0055; H04W 36/0094; H04W 48/16
See application file for complete search history.

(56) References Cited

U.S. PATENT DOCUMENTS

| | | | |
|---|---|---|---|
| 6,724,178 B1 * | 4/2004 | Katznelson | G01R 23/20 324/76.19 |
| 8,644,841 B1 * | 2/2014 | Oroskar | H04W 28/08 455/442 |
| 2012/0282864 A1 | 11/2012 | Dimou et al. | |

FOREIGN PATENT DOCUMENTS

| | | |
|---|---|---|
| CN | 101686472 A | 3/2010 |
| JP | 2012-100220 A | 5/2012 |

(Continued)

OTHER PUBLICATIONS

Pantech, "Discussions on CRE bias", 3GPP TSG RAN2 Meeting #73, Taipei, Taiwan, Feb. 21-25, 2011, R2-111293, Agenda Item: 7.5.1, Document for: Discussion, 6 pages.

(Continued)

*Primary Examiner* — Ayaz R Sheikh
*Assistant Examiner* — Debebe A Asefa
(74) *Attorney, Agent, or Firm* — Fay Sharpe LLP

(57) ABSTRACT

The present invention aims to provide method, apparatuses and systems for providing UE with biasing adjustment parameters about cell range expansion in a heterogeneous network. Herein, a current eNB determines, based on attribute information of one or more user equipments to be handed over, biasing adjustment parameters about cell range expansion of the one or more user equipments corresponding to their target eNB, and sends the biasing adjustment parameters to the one or more user equipments; the one or more user equipments adjust, based on the biasing adjustment biasing adjustment parameters, its report trigger condition of measurement report on measurement report on the (Continued)

current eNB and the target eNB, and report, the measurement report on the current eNB and the target eNB to the current eNB when the report trigger condition is satisfied; the current eNB makes a handover decision for corresponding user equipment(s) based on the measurement report. The present invention realizes a more flexible handover setting for the CRE load balancing and enhances the network efficiency and user QoS.

12 Claims, 6 Drawing Sheets

(56) References Cited

FOREIGN PATENT DOCUMENTS

| KR | 10-2012-0080514 A | 7/2012 |
|---|---|---|
| WO | 2012/093888 A2 | 7/2012 |
| WO | WO 2012/154100 A1 | 11/2012 |

OTHER PUBLICATIONS

New Postcom, "Impact from CRE and ABS on connection failures in HetNet," $3^{rd}$ Generation Partnership Project (3GPP), 3GPP TSG RAN WG3 Meeting #75bis, R3-120581, pp. 1-11, XP050669251, San Jose del Cabo, Mexico, Mar. 26-30, 2012.

Koichiro Kitagawa et al., "Performance Evaluation of Handover in LTE-Advanced Systems with Pico Cell Range Expansion," 2012 IEEE $23^{rd}$ International Symposium on Personal, Indoor and Mobile Radio Communications—(PIMRC), pp. 1071-1076, XP032272697, 2012.

International Search Report for PCT/IB2014/000572 dated Sep. 11, 2014.

* cited by examiner

METHOD, APPARATUS, AND SYSTEM FOR BIASING ADJUSTMENT OF CELL RANGE EXPANSION

FIELD OF THE INVENTION

The present invention relates to the field of wireless communication technology, and more particularly, relates to a technique of providing user equipment (UE) with biasing adjustment parameters about cell range expansion in a heterogeneous network.

BACKGROUND OF THE INVENTION

In a LTE HetNet (heterogeneous network), there are different kinds of low-power cells including pico cells, femto cells and relay cells, besides the traditional macro cells. Due to the large disparity between the transmit power level of macro eNBs and small eNBs, the downlink range of a small eNB is much smaller than that of a macro eNB. If cell selection is predominanty based on the downlink signal strength, the usefulness of small eNB will be greatly diminised.

The larger range of high-power eNBs limits the advantage of cell splitting by attracting most user equipments to macro eNBs based on signal strength without having enough macro eNB resources to efficiently serve these use equipment; meanwhile, low-power eNBs may not be serving any user equipments. Even if all the low-power eNBs can use available spectrum to serve at least one user equipment, the difference between the loadings of different eNBs can result in an unfair distribution of data rates and uneven user experiences among the user equipments in the network.

Therefore, from the perspective of network capacity, it is desirable to balance the load between macro and small eNBs by expanding the coverage of small eNBs and subsequently increase cell splitting gains. As shown in FIG. 1, wherein the range of pico cells is expanded, this concept is referred to as CRE (cell range expansion) which is an effective way for load balancing in HetNets.

The CRE may be realized by adjusting cell reselection parameters and handover parameters for idle UEs and connected UEs respectively. For the idle UEs, by adjusting the cell reselection parameter Qoffset at the macro cell, it may reselect a neighboring small cell; by adjusting Qhyst at the small cell, it remains residing in the small cell. Correspondingly, for the connected UEs, by increasing CIO (CellIndividualOffset) of a neighboring small cell, it may handover from the macro cell to the small cell early; by reducing CIO of a neighboring macro cell, it may handover out of the small cell later. It should be noted that adjusting CIO of one neighboring cell does not impact handover metrics towards other noninvolved cells.

Obviously, in the connected mode, CRE shifting the cell border virtually is a cell pair concept and so should be coordinated on cell pair basis. Once the macro user is handed over for small cell region expansion, it may be necessary to amend the handover parameters such as CIO, so that the user will not be handed over back to the macro cell due to signal reasons. The amendment must be performed in both cells, so that CIOs between the two cells remain coherent. In other words, in the case of load balancing, the change of handover parameters such as CIO is usually symmetrical: if the macro cell increases the CIO of its neighboring small cell, for example, by 2 dB, it means the cell border of the macro cell is moved −2 dB; meanwhile, the small cell should decrease the CIO of its neighboring macro cell by 2 dB to expand its own cell border by +2 dB. Here, the 2 dB is known as CRE biasing towards the small cell.

However, according to the current definition in LTE-related specifications, e.g., the definition in Release 11 published in June 2012, i.e., TS 36.331 v11.0.0 "Radio Resource Control (RRC); Protocol specification (Release 11), the handover parameters such as CIO are applied for all user equipments.

Handover Parameter Setting

In the connected mode, CRE biasing is applied for a UE in relation to handover to a new target cell. This is performed by measurement event A3. When the RSRP (Reference Signal Receiving Power) or RSRQ (Reference Signal Receiving Quality) of a neighboring cell is a given HOM (Handover Margin) better than the current serving cell for at least the duration of TTT (Time-to-Trigger), a handover decision is made to the UE to hand it over from the serving cell to the target cell.

An exemplary A3 trigger condition may be defined as:

$$Mn+Ofn+Ocn-Hys>Mp+Ofp+Ocp+\text{Off} \qquad (1)$$

where Mp and Mn are the RSRP or RSRQ levels of the serving cell and the target cell. Ofp and Ofn are the frequency specific offsets of the serving cell and the target cell. Ocp and Ocn are the cell specific offsets of the serving cell and the target cell, i.e., CIO. Hys is the hysteresis parameter common for all measurement events; Off is the offset parameter for event A3 regardless of neighboring cells.

The condition (1) may be simplified as below:

$$Mn>Mp+HOM(p,n) \qquad (2)$$

where HOM(n, p)=Ofp+Ocp+Off−Ofn−Ocn+Hys is usually called as the handover margin (HOM). That HOM(p, n) is a positive value indicates the handover is proposed to take place later. Obviously, HOM is a cell pair specific offset which shifts the cell border virtually. And as stated above, HOM should be coordinated on cell pair basis.

These handover parameters are either cell-specific or event-specific, but technically eNB could signal UE specific values to different UEs via dedicated RRC signalings. And then, the handover should be performed at the same point, including from macro cell to pico cell and from pico cell to macro cell, i.e., the neighboring cell should be aware of the individual values. Currently this is not possible via the X2 interface, which typically applies the same handover parameters to the UEs throughout the cell or even the network.

Mobility Settings Change

As above mentioned, once the macro cell user is handed over for range expansion of the small cell, it may be necessary to amend the handover parameter such as CIO, so that the user will not be handed over back to the macro cell due to signal reasons. The amendment must be performed in both cells, so that handover settings between the two cells remain coherent. For this purpose the Mobility Settings Change X2 procedure is defined in the LTE related specifications, e.g., TS 36.423 v11.0.0, "X2 application protocol (X2AP) (Release 11)" published in March 2012. The eNodeB that detects the change needs to estimate how much the cell border would need to be shifted to avoid quick return of the user. The shift of cell border is expressed in dBs and informed to the corresponding other cell in MOBILITY CHANGE REQUEST X2AP message as shown in FIG. 2. In the case of load balancing, the change is usually symmetrical: if the macro cell shifts its handover border by, for example, −2 dB, the small cell should extend its own by +2 dB.

However, only one signal HOM can be changed via the Mobility Settings Change procedure. It may be implemented by including the mobility parameters information IE (Information Element) within the MOBILITY CHANGE REQUEST message.

With reference to FIG. 2, the MOBILITY CHANGE REQUEST message is transmitted from eNB 1 to eNB 2 to initiate adaptation of the mobility parameters. The Table 1 below shows an exemplary MOBILITY CHANGE REQUEST message:

TABLE 1 an example of MOBILITY CHANGE REQUEST message

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Cell ID | M | | ECGI 9.2.14 | | YES | reject |
| eNB2 Cell ID | M | | ECGI 9.2.14 | | YES | reject |
| eNB1 Mobility Parameters | O | | Mobility Parameters Information 9.2.48 | Configuration change in eNB$_1$ cell. | YES | ignore |
| eNB2 Proposed Mobility Parameters | M | | Mobility Parameters Information 9.2.48 | Proposed configuration change in eNB$_2$ cell. | YES | reject |
| Cause | M | | 9.2.6 | | YES | reject |

The Mobility Parameters Information IE contains the change of the Handover Trigger with respect to its current value. The Handover Trigger corresponds to the threshold at which a cell initialises the handover preparation procedure towards a specific neighbour cell. That this change is a positive value indicates the handover is proposed to take place later. Table 2 below shows an exemplary Mobility Parameter Information IE:

TABLE 2 an example of Mobility Parameter Information IE

| IE/Group Name | Presence | Range | IE type and reference | Semantics description |
|---|---|---|---|---|
| Handover Trigger Change | M | | INTEGER (−20 . . . 20) | The actual value is IE value * 0.5 dB. |

Based on the above description, under the assumption of a fixed starting point, the information exchange via the Mobility Settings Change procedure could work only for a common set of HOM for each cell to cell relationship. This cannot support UE-specific or UE group-specific HOM exchange, i.e., it cannot set a CRE biasing value corresponding to the UE capability, thereby unable to realize a more flexible CRE load balancing.

The LTE's definition on the handover parameters such as CIO does not consider the receiver capability of UE. Obviously different UEs may have different capabilities to deal with severe interference in CRE region especially on control channels (even when ABS (Almost Blank Subframes) are used for eICIC (enhanced Inter-cell Interference Coordination), system signals such as CRS are still transmitted). For example, UEs supporting Release 8/9/10 may accept at most 6 dB biasing, but UEs supporting Release 11 with interference-cancellation receivers could work under larger biasing such as 9 dB, and UEs supporting Release 12 are expected to work under even larger CRE biasing with advanced receiver together with some network-assist signalings. Additionally, Rel-8/9 UEs cannot use 2 restricted measurement subsets for RRM (Radio Resource Management) and CSI (Channel State Information), so that may not work well in the CRE region even with ABS protection. In another example, besides DL signal strength, CRE may also be implemented based on other metrics such as DL pathloss or network utility. In order to implement DL pathloss or network utility based CRE, handover parameters such as CIO need to be enhanced on UE basis to map the DL signal strength to the associated UE.

For high-speed UEs, in the connected node, biasing may be used to reduce the handover rate, thereby decreasing handover failure. In this case, biasing (negative) is used to prevent the UE from being handed over to a small cell. It further requires a UE-speed specific biasing.

Therefore, the cell specific handover parameter is not flexible enough for CRE load balancing, but advantageous to the UE specific or UE group specific CRE, i.e., performing CRE with differentiation of UE's capability or speed to improve network efficiency and user QoS.

Besides, the prior art also proposes service class dependent load balancing for self organizing networks, which requires to expand single handover parameter setting to support distinct service class and correspondingly enhance the coordination of individual handover parameter setting for each distinct service class between neighboring cells. Obviously, the above service class based load balancing does not include the scenario of CRE. Further, the CRE biasing applied applied to a UE does not depend on its service class but on its attribute information such as receiver capability or mobility speed.

SUMMARY OF THE INVENTION

The present invention aims to provide method, apparatuses and systems for providing UE with biasing adjustment parameters about cell range expansion in a heterogeneous network.

According to one aspect of the present invention, an eNB for providing user equipments with biasing adjustment parameters in a heterogeneous network is provided, wherein the eNB comprises:

a biasing adjustment determining module configured to determine, based on attribute information of one or more user equipments to be handed over, biasing adjustment parameters about cell range expansion of the one or more user equipments corresponding to their target eNB;

a first adjustment sending module configured to send the biasing adjustment parameters to the one or more user equipments, such that the corresponding user equipment adjusts a report trigger condition of measurement report on the current eNB and the target eNB;

a handover decision module configured to receive the measurement report from the one or more user equipments, and make a handover decision for the one or more user equipments.

According to one aspect of the present invention, a user equipment for obtaining biasing adjustment parameters about cell range expansion from a current eNB in a heterogeneous network is provided, wherein the user equipment comprises:

a first adjustment receiving module configured to receive, from the current eNB, the biasing adjustment parameters about cell range expansion corresponding to a target eNB;

a biasing adjustment module configured to adjust, based on the biasing adjustment parameters, a report trigger condition of measurement report on the current eNB and the target eNB;

a measurement report reporting module configured to report the measurement report to the current eNB when the report trigger condition is satisfied, so as to be available for the current eNB to make a handover decision.

According to one aspect of the present invention, a target eNB for facilitating a current eNB to provide user equipments with biasing adjustment parameters in a heterogeneous network is provided, wherein the target eNB comprises:

a second adjustment receiving module configured to receive, from the current eNB, the biasing adjustment parameters about cell range expansion determined for the user equipments;

a handover parameter adjustment module configured to adjust, based on the biasing adjustment parameters, handover parameters about the cell range expansion corresponding to the current eNB.

According to one aspect of the present invention, a system for providing user equipments with biasing adjustment parameters about cell range expansion in a heterogeneous network is provided, wherein the system comprises the foresaid eNB for providing user equipments with biasing adjustment parameters in a heterogeneous network and the foresaid user equipment for obtaining biasing adjustment parameters about cell range expansion from a current eNB in a heterogeneous network.

According to one aspect of the present invention, a system for providing user equipments with biasing adjustment parameters about cell range expansion in a heterogeneous network is provided, wherein the system comprises the foresaid eNB for providing user equipments with biasing adjustment parameters in a heterogeneous network, the foresaid user equipment for obtaining biasing adjustment parameters about cell range expansion from a current eNB in a heterogeneous network and the foresaid target eNB for facilitating a current eNB to provide user equipments with biasing adjustment parameters in a heterogeneous network.

According to one aspect of the present invention, a method for providing user equipments with biasing adjustment parameters about cell range expansion in a heterogeneous network is provided, wherein the method comprises the following steps:

A. determining, by a current eNB, based on attribute information of one or more user equipments to be handed over, biasing adjustment parameters about cell range expansion of the one or more user equipments corresponding to their target eNB;

B. sending, by the current eNB, the biasing adjustment parameters to the one or more user equipments;

C. adjusting, by the one or more user equipments, based on the biasing adjustment parameters, its report trigger condition of measurement report on the current eNB and the target eNB;

D. reporting, by the one or more user equipments, the measurement report on the current eNB and the target eNB to the current eNB when the report trigger condition is satisfied;

E. making, by the current eNB, a handover decision for corresponding user equipment(s) based on the measurement report.

Compared with the prior art, the present invention provides UE-specific or UE group-specific biasing adjustment parameters about cell range expansion based on UE's attribute information, which realizes a more flexible handover setting for the CRE load balancing and enhances the network efficiency and user QoS.

BRIEF DESCRIPTION OF THE DRAWINGS

Through reading the following detailed depiction on the non-limiting embodiments with reference to the accompanying drawings, the other features, objectives, and advantages of the present invention will become clearer.

Same or like reference numerals in the accompanying drawings indicate the same or corresponding components.

DETAILED DESCRIPTION OF THE INVENTION

Hereinafter, the present invention will be further described in detail with reference to the accompanying drawings.

For the convenience of illustration, the present invention mostly poses an example and makes an illustration in the following scenario: in a heterogeneous network, the pico cell is located within the coverage of a macro cell; the user equipment is currently connected to the macro cell; through cell range expansion of the pico cell, the user equipment is to be handed over to the pico cell, that is, the macro cell is the current cell of the user equipment, and the pico cell is the target cell of the user equipment. Besides, as above described, the cell range expansion is based on a cell pair. In this scenario, the macro cell and the pico cell form a cell pair, which cooperate with each other to realize cell range expansion for the pico cell.

Those skilled in the art should understand that the above scenario is only exemplary for illustrating the present invention, which should not be understood as any limitation to the present invention. Other existing or future scenario, for example, handing the user equipment from the pico cell to the macro cell, as long as it can be applied to the present invention, should be included within the protection scope of the present invention.

Figure 3:
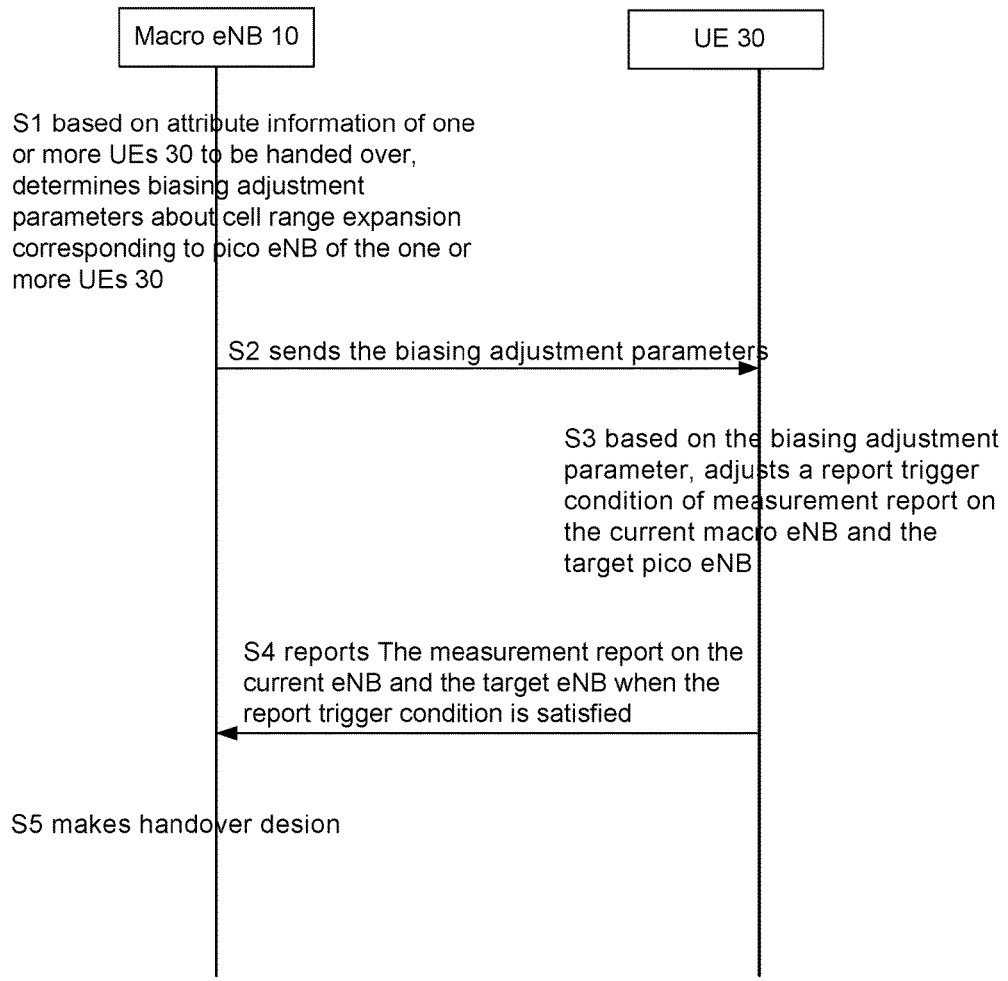
FIG. 3 shows a flow chart of a method for providing UE with biasing adjustment parameters about cell range expansion in a heterogeneous network according to one embodiment of the present invention.

According to one embodiment of the present invention, as shown in FIG. 3, in step S1, a current macro eNB 10 determines, based on attribute information of one or more UEs 30 to be handed over, biasing adjustment parameters about cell range expansion of the one or more UEs 30 corresponding to their pico eNB 20

Here, the attribute information of UE includes any attributes applicable to the present invention for determining the biasing adjustment parameters of UE, such as the LTE release version supported by UE, the mobility speed state of UE, and the like. The biasing adjustment parameters include any parameters applicable to the present invention for affecting the measurement events of the current cell and the target cell and accordingly adjusting the report trigger condition of corresponding measurement report, such as individual CIO, scaling factor of the adjustment of the CRE biasing, etc.

In step S2, the current macro eNB 10 sends the UE specific biasing adjustment parameters determined in step S1 to these UEs 30 such that the corresponding UE 30 adjusts its report trigger condition of measurement report on the current macro eNB 10 and the target pico eNB 20.

Here, the macro eNB 10 may send the UE-specific biasing adjustment parameters to a corresponding UE 30: in one preferred embodiment, the macro base 10 may determine a corresponding biasing adjustment parameters for each to-be-handed-over UE 30, and send the biasing adjustment parameters to the corresponding UE 30; in another preferred embodiment, the macro eNB 10 may group the to-be-handed-over UE 30 and determine respective biasing adjustment parameters based on attribute information of one or more UE groups obtained from the grouping, and then send the determined biasing adjustment parameters to the corresponding UE 30.

Alternatively, the macro eNB 10 may send the determined biasing adjustment parameters to all UEs 30; each UE 30 itself determines which biasing adjustment parameter is adopted based on its attribute information, i.e., selecting a proper biasing adjustment parameter among the biasing adjustment parameters sent from the macro eNB 10. For example, the macro eNB determines corresponding biasing adjustment parameters for high-speed UEs and low-speed UEs, respectively, based on the mobility speed states of UEs, and sends the two biasing adjustment parameters to all UEs, then each UE selects a corresponding biasing adjustment parameter based on its mobility speed state.

Correspondingly, the UE 30 receives, from the current macro eNB 10, its biasing adjustment parameter about cell range expansion corresponding to the target pico eNB 20.

In step S3, the UE 30, based on the biasing adjustment parameter, adjusts a report trigger condition of measurement report on the current macro eNB 10 and the target pico eNB 20.

In a preferred embodiment, the UE 30 adjusts the report trigger condition of the measurement report on the current macro eNB 10 and the target pico eNB 20 based on the biasing adjustment parameter in view of the common CRE biasing parameter of the current macro eNB 10 about the cell range expansion of the target pico eNB 10. For example, the UE 30 evaluates whether it is necessary to report the measurement report on the macro eNB 10 and the target pico eNB 20 based on the biasing adjustment parameter and the common CRE biasing parameter sent by the macro eNB 10.

For example, in LTE, a UE should apply the speed dependent scaling factors to adjust the cell reselection parameters in idle mode and TimeToTrigger value in connected mode if the UE is in High-mobility or Medium-mobility state, thereby realizing the UE specific CRE biasing.

The macro eNB could signal certain speed dependent Scaling Factors for HOM parameters such as CIO. Since mobility state detection has been supported, UEs could modify and judge its event A3 condition correspondingly according to the scaling factor upon HOM parameters, i.e., the UE could adjust the report trigger condition of the measurement report on the current macro eNB and the target pico eNB accordingly.

Besides mobility speed state, the scaling factor could relate to other information such as LTE release version supported by UE, and this information is known at the current eNB. Since UEs realized under different LTE release versions have different receiver capabilities or/and signaling supports, the former such as CRS IC, the latter such as restricted RRM/CSI measurement, maximum acceptable CRE biasing values are different. Then the current eNB may indicate version dependent scaling factors on HOM parameters to the UE.

Further, if more detail UE-capability-related information could be obtained by the current eNB, such as UEs produced by different vendors may have different receiver capabilities even under the same LTE release version, the current eNB could signal UE specific scaling factor on the common HOM parameters to individual UEs.

It should be noted that, the biasing adjustment parameters such as scaling factor, is transmitted via RRC signaling and performed at the UE side which does not impact the common HOM parameter in the prior art, such as CRE biasing applicable for all UEs, and so that there is no need to enhance the current Mobility Settings Change procedure.

In another preferred embodiment, the macro eNB 10 is not only required to send the biasing adjustment parameters to the UE 30, but also to send the biasing adjustment parameters of corresponding UE 30 to the target pico eNB 20, and the target pico eNB 20 adjusts its handover parameters corresponding to the cell range expansion accordingly.

For example, the macro eNB 10 could directly signal UE or UE group specific biasing adjustment parameters such as individual CIO to the UE or UE group to be handed over via dedicated RRC signalings. And as said above, since the handover should be carried out at the same point, the neighboring target pico eNB 20 should be aware of the UE or UE group specific individual CIO values. Then the current X2 procedure of Mobility Settings Change is required to be extended. And to differentiate the CRE to general load balancing, an explicit cause could be included in the MOBILITY CHANGE REQUEST message.

Figure 1:
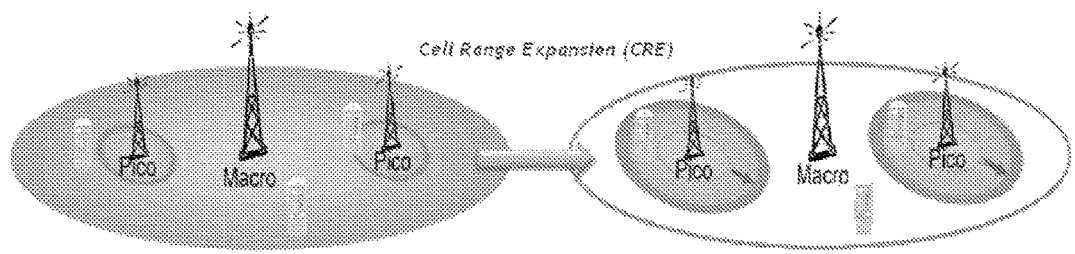
FIG. 1 shows a diagram of the concept of cell range expansion.
Figure 2:
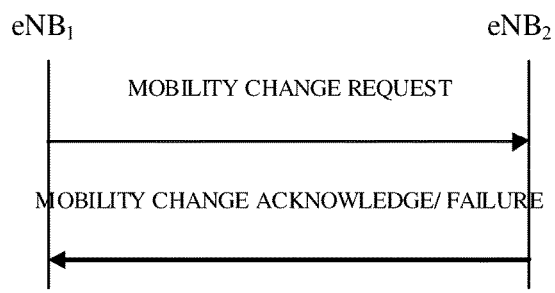
FIG. 2 shows a message flow chart of mobility settings change procedure between neighboring eNBs in a prior art.
Figure 4:
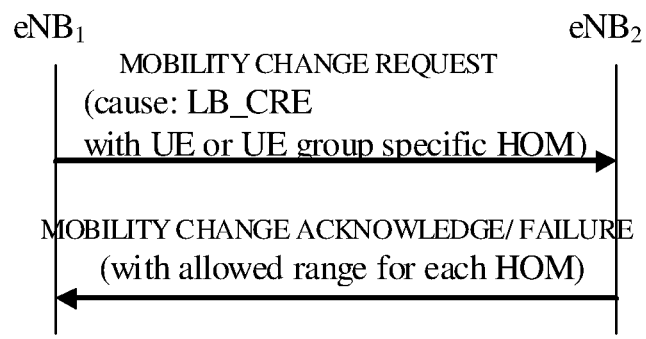
FIG. 4 shows a message flow chart of an enhanced mobility settings change procedure between neighboring macro cell and pico cell according to one modified example of the present invention.

With reference to FIG. 4, it shows an example of Enhancement of the Mobility Settings Change procedure. In conjunction with FIG. 2, in the enhancement example shown in FIG. 4, the eNB 1 such as the current macro eNB sends an enhanced MOBILITY CHANGE REQUEST message including cause of action carrying UE or UE group specific HOM parameters, to eNB 2 such as a target pico cell 20; correspondingly, the eNB 2 returns a MOBILITY CHANGE ACKNOWLEDGE/FAILURE message to the eNB 1, wherein the MOBILITY CHANGE FAILURE message carries the allowed biasing adjustment range for each HOM.

Two enhanced X2 signaling in the Mobility Settings Change procedure are illustrated as below.

In the first example, expanding the use of the Mobility Parameters Information IE and the Mobility Parameters Modification Range IE as defined in Sections 9.2.48 and 9.2.49 of TS 36.423, respectively. Here, the Mobility Parameters Information IE contains the change of the Handover Trigger as compared to its current value. The Handover Trigger corresponds to the threshold at which a cell initializes the handover preparation procedure towards a specific neighboring cell. Positive value of the change means the handover is proposed to take place later. Table 3 below shows an exemplary expanded Mobility Parameters Information IE, where if UE specific change is included, the handover trigger change is not valid for that specific UE or UE group.

In the second example, a new UE Specific Mobility Parameters Information IE and a new UE Specific Mobility Parameters Modification Range IE with respect to a specific UE or UE group are defined. The UE Specific Mobility Parameters Information IE contains the change of the Handover Trigger as compared to its current value. The Handover Trigger corresponds to the threshold at which a cell initializes the handover preparation procedure towards a specific neighbor cell. Positive value of the change means the handover is proposed to take place later. Table 5 below shows an exemplary new UE Specific Mobility Parameters Information IE, where Handover Trigger Change is only valid for the specific UE or UE group.

TABLE 5 an example of new UE Specific Mobility Parameters Information IE

| IE/Group Name | Presence | Range | IE type and reference | Semantics description |
|---|---|---|---|---|
| UE ID or UE Group ID | M | | | |

TABLE 3 an example of expanded Mobility Parameters Information IE

| IE/Group Name | Presence | Range | IE type and reference | Semantics description |
|---|---|---|---|---|
| Handover Trigger Change | M | | INTEGER (−20 . . . 20) | The actual value is IE value * 0.5 dB. |
| >UE specific change | O | | | |
| >> UE ID or UE Group ID | | | | |
| >> change value | | | INTEGER (−20 . . . 20) | The actual value is IE value * 0.5 dB. |

The Mobility Parameters Modification Range IE contains the range of Handover Trigger Change values permitted by the eNB2 at the moment the MOBILITY CHANGE FAILURE message is sent. Table 4 below shows an exemplary expanded Mobility Parameters Modification Range IE, where if UE specific lower or upper limit is included, the Handover Trigger Change Lower or upper Limit is not valid for that specific UE or UE group.

TABLE 5-continued an example of new UE Specific Mobility Parameters Information IE

| IE/Group Name | Presence | Range | IE type and reference | Semantics description |
|---|---|---|---|---|
| Handover Trigger Change | M | | INTEGER (−20 . . . 20) | The actual value is IE value * 0.5 dB. |

TABLE 4 an example of expanded Mobility Parameters Modification Range IE

| IE/Group Name | Presence | Range | IE type and reference | Semantics description |
|---|---|---|---|---|
| Handover Trigger Change Lower Limit | M | | INTEGER (−20 . . . 20) | The actual value is IE value * 0.5 dB. |
| >UE specific lower limit | O | | | |
| >> UE ID or UE Group ID | | | | |
| >> change value | | | INTEGER (−20 . . . 20) | The actual value is IE value * 0.5 dB. |
| Handover Trigger Change Upper Limit | M | | INTEGER (−20 . . . 20) | The actual value is IE value * 0.5 dB. |
| >UE specific upper limit | O | | | |
| >> UE ID or UE Group ID | | | | |
| >> change value | | | INTEGER (−20 . . . 20) | The actual value is IE value * 0.5 dB. |

The UE Specific Mobility Parameters Modification Range IE contains the range of Handover Trigger Change values permitted by the eNB$_2$ at the moment the MOBILITY CHANGE FAILURE message is sent. Table 6 below shows an exemplary new UE Specific Mobility Parameters Modification Range IE, where Handover Trigger Change Lower and Upper Limits are only valid for the specific UE or UE group.

TABLE 6 an example of new UE Specific Mobility Parameters Modification Range IE

| IE/Group Name | Presence | Range | IE type and reference | Semantics description |
|---|---|---|---|---|
| UE ID or UE Group ID | M | | | |
| Handover Trigger Change Lower Limit | M | | INTEGER (−20 . . . 20) | The actual value is IE value * 0.5 dB. |
| Handover Trigger Change Upper Limit | M | | INTEGER (−20 . . . 20) | The actual value is IE value * 0.5 dB. |

Obviously, since X2 support is required here, the another preferred embodiment is more suitable for UE group specific CRE which only introduces limited overload. UEs could be grouped based on UE mobility speed state, LTE release version supported or other capabilities.

In step s4, when the report trigger condition is satisfied, the UE 30 reports to the current macro eNB 10 the measurement report on the current macro eNB 10 and the target pico eNB 20, so as to be available for the current eNB 10 to make a handover decision. Correspondingly, the current macro eNB 10 receives from the UE 30 its reported measurement report and makes a handover decision for the UE 30 in step S5.

Figure 5:
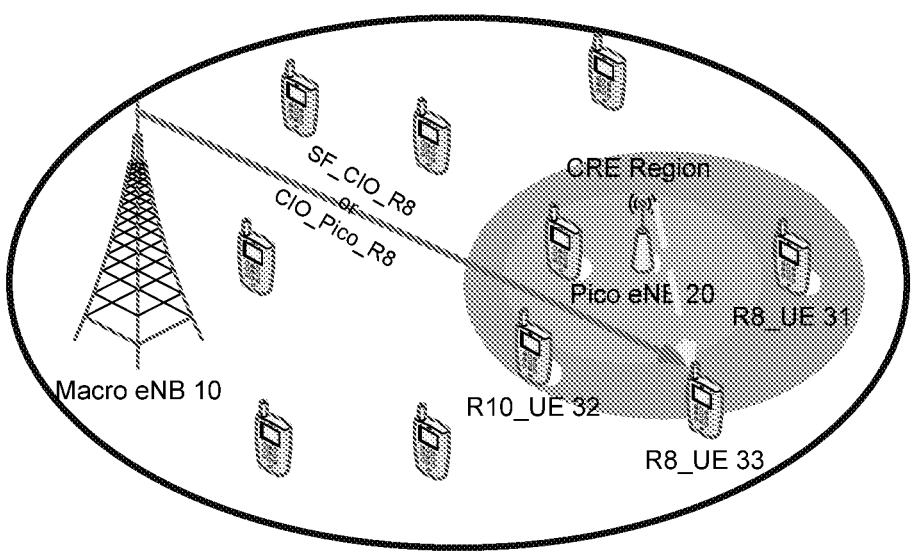
FIG. 5 shows a schematic diagram of an application embodiment according to the present invention.

With reference to FIG. 5, according to one application embodiment of the present invention, wherein a pico cell 20 is located within the coverage of a macro cell 10, and there is a large difference in Tx power between them, e.g., the difference may be up to 20 dB. There are 10 UEs in the macro cell 10, but only one UE of them is connected to the pico cell 20 based on max-RSRP cell association. All the UEs have the same traffic requirement, e.g., full buffer, and the same service class, such that all UEs should be treated equally in resource allocation, e.g., under Round-Robin scheduling or Proportional Fair scheduling. However, the only 1 UE in the pico cell 20 has a higher data rate due to occupation of 100% resource, while the 9 UEs in the macro cell 10 can only use ⅑ of the resource in average, which leads to unfair user experience in the network. Therefore, cell range expansion of the pico cell 20 could render the UE handed over from the macro cell 10 to the pico cell 20.

There are always some UEs supporting old LTE version together with the UEs supporting new LTE version handed over to the pico cell 20 under the common CRE biasing. For example, the macro cell 10 sets that the common CRE biasing is 6 dB, i.e., the CIO of the pico cell 20 is increased by 6 dB, and 3 UEs will be reconnected to the pico cell 20 after reevaluating their event A3 metric. For the 3 macro UEs, the relative RSRP differences are 2 dB, 4 dB and 5 dB respectively, and the LTE release version supported are 8, 10, and 8 respectively, and they are marked as R-8 UE 31, R-10 UE 32, and R-8 UE 33 respectively. Obviously the Rel-8 UE 33 having 5 dB RSRP difference will have at most −5 dB SINR (Signal to Interference plus Noise Ratio) after handed over to the pico cell 20. For the Rel-8 UE and Rel-10 UE, the maximum acceptable biasing values (which may be marked as max_bias_R8 and max_bias_R10) may be e.g. 3 dB and 6 dB respectively, considering control channel performance. Then, the R-8 UE 33 cannot work well under −6 dB biasing, such that the R-8 UE 33 should not be handed over and still be served by the macro cell 10. This could be achieved by treating the corresponding UEs differently depending on their LTE release version, i.e. by setting different bias values for different UEs.

In one example, the macro cell 10 adjusts the common CRE biasing by sending the scaling factor to UE. Here, those skilled in the art should understand that the scaling factor should not be understood narrowly from its literal meaning; instead, it should be understood from a broader perspective, including, but not limited to, proportionally adjusting the common CRE biasing, increasing or decreasing the common CRE biasing, etc.

For example, besides increasing the common CIO corresponding to the pico cell 20 by 6 dB, the macro cell 10 also signals one scaling factor of the CIO for UE supporting LTE release version 8, which can be marked as SF_CIO_R8, such that SF_CIO_R8=common CRE biasing−max_bias_R8=6 dB−3 dB=3 dB. Correspondingly, each R-8 UE will obtain the LTE release version dependent UE specific CIO by reducing its received common CRE biasing by the scaling factor SF_CIO_R8, such that although R-8 UE's nominal CRE biasing is 6 dB, its actually used CRE biasing is 3 dB. It should be noted that this way will not impact the behavior of the Rel-8 UE 31 having 2 dB RSRP difference, i.e., since operational bias for Rel-8 UEs is 3 dB, Rel-8 UEs having RSRP difference lower than max_bias_R8 will still be handed over to the pico cell 20.

It should also be noted that, the pico cell 20 should correspondingly decrease its common CIO towards the macro cell 10 by 6 dB to avoid ping-pong, i.e., let the handed over macro UEs stay in the pico cell 20 without triggering event A3 again. This coordination has been realized by Mobility Settings Change procedure In another example, the macro cell 10 directly sends individual CIOs to the UEs and the pico cell 20 so as to adjust the handover parameters. For example, the macro cell 10 signals two individual CIOs corresponding to the pico cell 20 to the UEs supporting LTE Release version 8 and 10, which are marked as CIO_Pico_R8 and CIO_Pico_R10 respectively, and are 3 dB and 6 dB respectively. The UEs evaluate individual event A3 metric according to the received individual CIOs. However, for CRE purpose, two neighboring eNBs, e.g., the macro cell 10 and the pico cell 20, have to be communicated, negotiated and set into operation between the neighbour cells in a coordinated way in order to adjust the handover parameters setting and avoid the ping-pong effect. Therefore, the UE or UE group specific handover settings parameters need to be exchanged, which requires changing the current Mobility Settings Change procedure.

Figure 6:
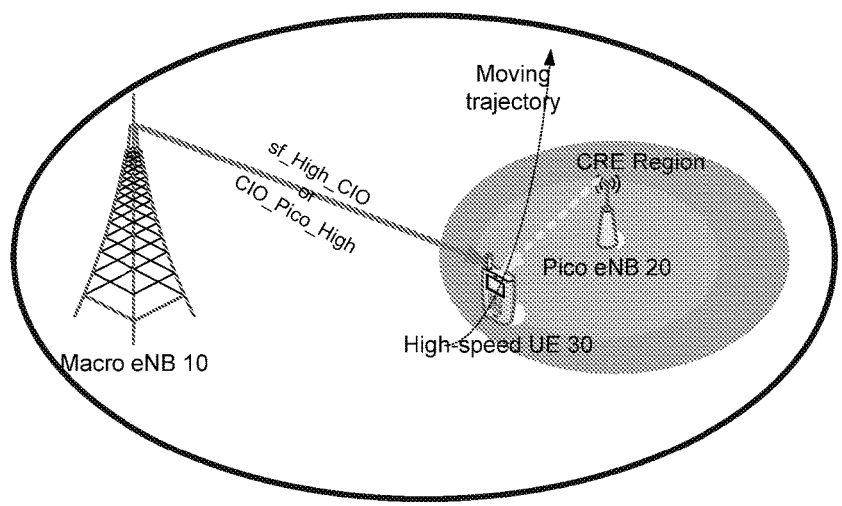
FIG. 6 shows a schematic diagram of another application embodiment according to the present invention.

With reference to FIG. 6, according to one application embodiment of the present invention, a high-speed macro cell UE 30 moves towards a pico cell 20; the UE 30 also receives the common CIO of the neighboring pico cell 20, e.g., 6 dB. Under current measurement setting, this UE 30 will be handed over to the pico cell 20 earlier than static UEs with the same radio condition because UEs shall adjust the value of timeToTrigger depending on the UE speed. And since the speed-dependent scaling factor is less than or equal to 1.0, the timeToTrigger of high-speed UEs is shorter than static UEs.

However, the cell radius of small cell is usually small due to low transmission power, e.g., 50 m or less. As for the UE with medium or high speed, e.g., 60 km/h, the residence time when the UE passed through the small cell with a cell diameter of 50 m is less than 2.5 seconds. Therefore, in this case, it is easier to reside the UE in the macro cell.

This could be realized either by increasing TimeToTrigger of high-speed UEs or lowering down the CIO of pico for high-speed UEs. Obviously, increasing timeToTrigger is not applied because this timeToTrigger is used for all events and for all measured neighboring cells, and specially setting shorter timeToTrigger for high-speed UEs is suitable for handover between macro cells.

Therefore, it is a suitable way to signal a less CIO corresponding to the pico cell to the high-speed UE, which will not affect much on other measurement scenarios such as macro-to-macro measurement.

In one example, the macro cell 10 signals a speed dependent scaling factor corresponding to the neighboring pico cell CIO, which is marked as SF_High_CIO, e.g. with a value of −10 dB, to the high-speed UE 30. Then the used CIO of the pico cell 20 at the high-speed UE=common CRE biasing+SF_High_CIO=6 dB−10 dB=−4 dB. The negative pico cell CIO will make high-speed UEs handed over to pico much later.

In another example, the macro cell 10 signals different CIOs of the neighboring pico cell 20 to specific UEs, e.g., 6 dB CIO to static UEs and −4 dB CIO to high-speed UEs (e.g., marked as CIO_Pico_High). Alternatively, the macro cell 10 may signal two CIOs to each UE, such that each UE determines which CIO to use based on its own mobility estimation. Then static UEs will be CREed as expected and high-speed UEs will be kept in the macro 10 unless the RSRP of the pico cell 20 is 4 dB larger than that of the macro cell 10. Here, since the high-speed UE needs not to be handed over to the pico cell, the pico cell needs not know the high-speed specific CIO to avoid the ping-pong effect.

Figure 7:
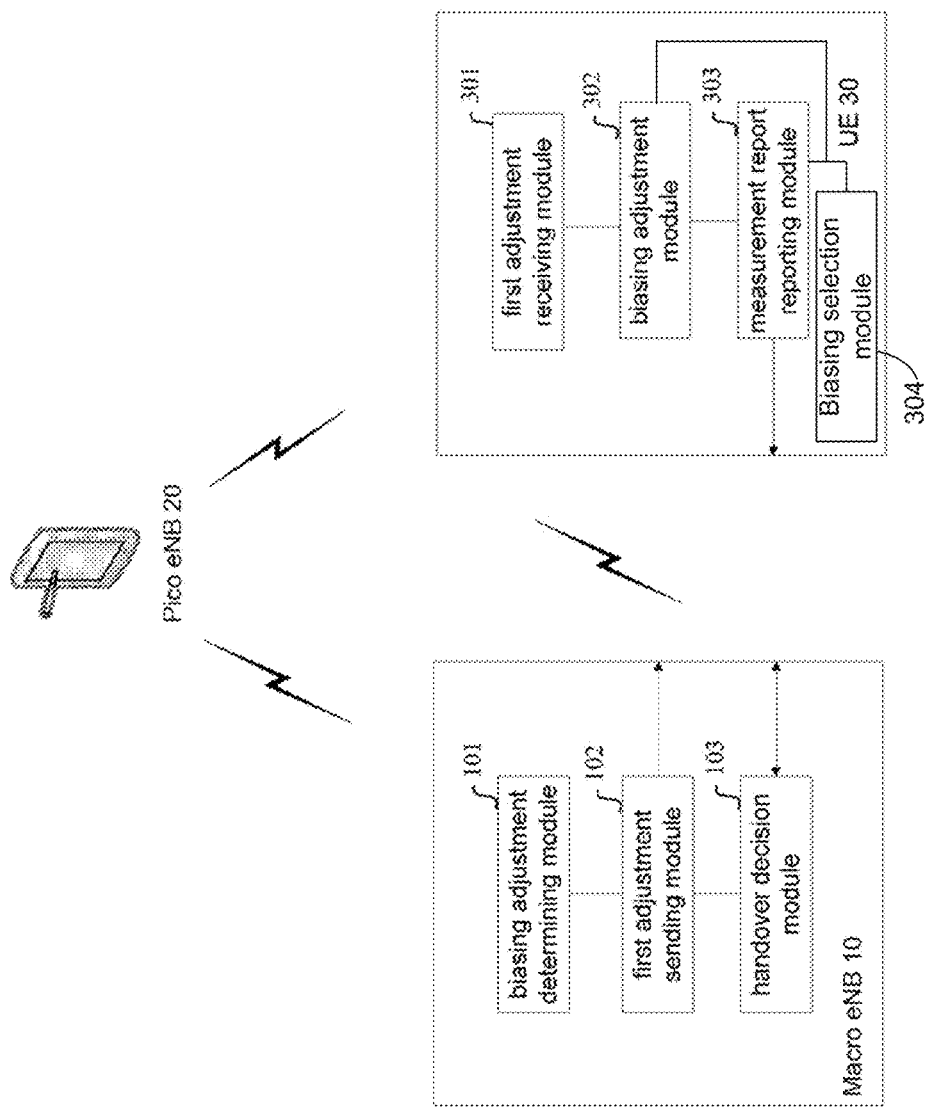
FIG. 7 shows a diagram of apparatuses for providing UE with biasing adjustment parameters about cell range expansion in a heterogeneous network according to another embodiment of the present invention.

According to another embodiment of the present invention, as shown in FIG. 7, a current eNB 10 includes a biasing adjustment determining module 101, a first adjustment sending module 102 and a handover decision module 103; a UE 30 includes a first adjustment receiving module 301, a biasing adjustment module 302, and a measurement report reporting module 303, and a biasing selection module 304 configured to select a corresponding preferred biasing adjustment parameter from among the UE-specific biasing adjustment parameters based on attribute information of the user equipment.

Specifically, the biasing adjustment determining module 101 determines, based on attribute information of one or more UEs 30 to be handed over, biasing adjustment parameters about cell range expansion of the one or more UEs 30 corresponding to their target eNB.

Here, the attribute information of UE includes any attributes applicable to the present invention for determining the biasing adjustment parameters of UE, such as the LTE release version supported by UE, the mobility speed state of UE, and the like. The biasing adjustment parameters include any parameters applicable to the present invention for affecting the measurement events of the current cell and the target cell and accordingly adjusting the report trigger condition of corresponding measurement report, such as individual CIO, scaling factor of the adjustment of the CRE biasing, etc.

Then, the first adjustment sending module 102 of the current macro eNB 10 sends the biasing adjustment parameters determined by the biasing adjustment determining module 101 to these UEs 30 such that the corresponding UE 30 adjusts a report trigger condition of measurement report on the current macro eNB 10 and the target pico eNB 20.

Here, the first adjustment sending module 102 may send the UE-specific biasing adjustment parameters to a corresponding UE 30: in one preferred embodiment, the biasing adjustment determining module 101 may determine a corresponding biasing adjustment parameters for each to-be-handed-over UE 30, and the first adjustment sending module 102 may send the biasing adjustment parameters to the corresponding UE 30; in another preferred embodiment, the biasing adjustment determining module 101 may group the to-be-handed-over UE 30 and determine respective biasing adjustment parameters based on attribute information of one or more UE groups obtained from the grouping, and then the first adjustment sending module 102 may send the determined biasing adjustment parameters to corresponding UE 30.

Alternatively, the first adjustment sending module 102 may send the determined biasing adjustment parameters to all UEs 30; each UE 30 itself determines which biasing adjustment parameter is adopted based on its attribute information, i.e., selecting a proper biasing adjustment parameter among the biasing adjustment parameters sent from the first adjustment sending module 102. For example, the biasing adjustment determining module 101 determines corresponding biasing adjustment parameters for high-speed UEs and low-speed UEs, respectively, based on the mobility speed states of UEs, and the first adjustment sending module 102 sends the two biasing adjustment parameters to all Ues, then each UE selects a corresponding biasing adjustment parameter based on its mobility speed state.

Correspondingly, the first adjustment receiving module 301 of UE 30 receives, from the current macro eNB 10, its biasing adjustment parameter about cell range expansion corresponding to the target pico eNB 20.

The biasing adjustment module 302 of UE 30 adjusts, based on the biasing adjustment parameter, a report trigger condition of measurement report on the current macro eNB 10 and the target pico eNB 20.

In a preferred embodiment, the biasing adjustment module 302 adjusts the report trigger condition of the measurement report on the current macro eNB 10 and the target pico eNB 20 based on the biasing adjustment parameter in view of the common CRE biasing parameter of the current macro eNB 10 about the cell range expansion of the target pico eNB 10. For example, the biasing adjustment module 302 evaluates whether it is necessary to report the measurement report on the macro eNB 10 and the target pico eNB 20 based on the biasing adjustment parameter and the common CRE biasing parameter sent by the macro eNB 10.

In another preferred embodiment, the macro eNB 10 further includes a second adjustment sending module (not shown) which sends the biasing adjustment parameters of the corresponding UE 30 to the target pico eNB 20. Correspondingly, the target pico eNB further includes a second adjustment receiving module (not shown) and a handover parameter adjustment module (not shown), herein the second adjustment receiving module receives the biasing adjustment parameters sent from the macro eNB 10 and the handover parameter adjustment module adjusts handover parameters about the cell range expansion of the target pico eNB 20 accordingly.

The measurement report reporting module 303 of UE 30 reports the measurement report on the current macro eNB 10 and the target pico eNB 20 to the current macro eNB 10 when the report trigger condition is satisfied, so as to be available for the current macro eNB 10 to make a handover decision. Correspondingly, the handover decision module 103 of the current macro eNB 10 receives from the UE 30 the reported measurement report, so as to make a handover decision for the UE 30.

It should be noted that the present invention may be implemented in software or a combination of software and hardware; for example, it may be implemented by an ASIC (Application Specific Integrated Circuit), a general-purpose computer, or any other similar hardware devices.

The software program of the present invention may be executed by a processor to implement the above steps or functions. Likewise, the software program of the present invention (including relevant data structure) may be stored in a computer readable recording medium, for example, a RAM memory, a magnetic or optical driver, or a floppy disk, and other similar devices. Besides, some steps or functions of the present invention may be implemented by hardware, for example, a circuit cooperating with a processor to execute various functions or steps.

Additionally, a portion of the present invention may be applied as a computer program product, for example, a computer program instruction, which, may invoke or provide a method and/or technical solution according to the present invention through operations of the computer when executed by the computer. Further, the program instruction invoking the method of the present invention may be stored in a fixed or mobile recording medium, and/or transmitted through broadcast or data flow in other signal bearer media, and/or stored in a working memory of a computer device which operates based on the program instruction. Here, one embodiment according to the present invention comprises an apparatus comprising a memory for storing a computer program instruction and a processor for executing the program instruction, wherein when the computer program instruction is executed by the processor, the apparatus is triggered to run the methods and/or technical solutions according to a plurality of embodiments of the present invention.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims instead of the above description, and all variations intended to fall into the meaning and scope of equivalent elements of the claims should be covered within the present invention. No reference signs in the claims should be regarded as limiting of the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. An eNB for providing user equipments with biasing adjustment parameters in a heterogeneous network, wherein the eNB comprises:
    a biasing adjustment determining module configured to determine, based on attribute information of one or more user equipments to be handed over, UE-specific biasing adjustment parameters about cell range expansion of the one or more user equipments corresponding to their target eNB, wherein the attribute information includes LTE release version supported and mobility speed state;
    a first adjustment sending module configured to send the UE-specific biasing adjustment parameters to the one or more user equipments, such that the corresponding user equipment adjusts a report trigger condition of measurement report on the current eNB and the target eNB;
    a handover decision module configured to receive the measurement report from the one or more user equipments, and make a handover decision for the one or more user equipments.

2. The eNB according to claim 1, wherein the first adjustment sending module is further configured to:
    send the UE-specific biasing adjustment parameters to the one or more user equipments, such that the corresponding user equipment adjusts the report trigger condition in view of a common biasing parameter of the current eNB about cell range expansion of the target eNB.

3. The eNB according to claim 1, wherein the eNB further comprises:
    a second adjustment sending module configured to send the UE-specific biasing adjustment parameters to the target eNB, such that the target eNB adjusts its handover parameters corresponding to the cell range expansion.

4. The eNB according to claim 1, wherein the biasing adjustment decision module is configured to:
    group the one or more user equipments to be handed over to obtain corresponding one or more user equipment groups;
    determine, based on attribute information of the one or more user equipment groups, UE-specific biasing adjustment parameters about cell range expansion corresponding to their target eNB of the one or more user equipment groups.

5. A user equipment for obtaining UE-specific biasing adjustment parameters about cell range expansion from a current eNB in a heterogeneous network, wherein the user equipment comprises:
    a first adjustment receiving module configured to receive, from the current eNB, the UE-specific biasing adjustment parameters about cell range expansion corresponding to a target eNB;
    a biasing adjustment module configured to adjust, based on the UE-specific biasing adjustment parameters, a report trigger condition of measurement report on the current eNB and the target eNB;
    a measurement report reporting module configured to report the measurement report to the current eNB when the report trigger condition is satisfied, so as to be available for the current eNB to make a handover decision;

wherein the user equipment further comprises:
  a biasing selection module configured to select a corresponding preferred biasing adjustment parameter from among the UE-specific biasing adjustment parameters based on attribute information of the user equipment, wherein the attribute information includes LTE release version supported and mobility speed state;
wherein the biasing adjustment module is configured to:
  adjust the report trigger condition of the measurement report based on the preferred biasing adjustment parameter.

6. The user equipment according to claim 5, wherein the biasing adjustment module is further configured to:
  adjust the report trigger condition based on the UE-specific biasing adjustment parameters in view of a common biasing parameter of the current eNB about cell range expansion of the target eNB.

7. A target eNB for facilitating a current eNB to provide user equipments with UE-specific biasing adjustment parameters in a heterogeneous network, wherein the target eNB comprises:
  a second adjustment receiving module configured to receive, from the current eNB, the UE-specific biasing adjustment parameters about cell range expansion determined for the user equipments based on attribute information that includes LTE release version supported by each user equipment;
  a handover parameter adjustment module configured to adjust, based on the UE-specific biasing adjustment parameters, handover parameters about the cell range expansion corresponding to the current eNB.

8. A system for providing user equipments with UE-specific biasing adjustment parameters about cell range expansion in a heterogeneous network, wherein the system comprises an eNB according to claim 1 and a user equipment.

9. A system for providing user equipments with UE-specific biasing adjustment parameters about cell range expansion in a heterogeneous network, wherein the system comprises an eNB according to claim 1, a user equipment, and a target eNB.

10. A method for providing user equipments with UE-specific biasing adjustment parameters about cell range expansion in a heterogeneous network, wherein the method comprises:
  determining, by a current eNB, based on attribute information of one or more user equipments to be handed over, UE-specific biasing adjustment parameters about cell range expansion of the one or more user equipments corresponding to their target eNB, wherein the attribute information includes LTE release version supported and mobility speed state;
  sending, by the current eNB, the UE-specific biasing adjustment parameters to the one or more user equipments;
  adjusting, by the one or more user equipments, based on the UE-specific biasing adjustment parameters, its report trigger condition of measurement report on the current eNB and the target eNB;
  reporting, by the one or more user equipments, the measurement report on the current eNB and the target eNB to the current eNB when the report trigger condition is satisfied;
  making, by the current eNB, a handover decision for corresponding user equipment(s) based on the measurement report.

11. The method according to claim 10, wherein the adjusting comprises:
  adjusting, by the one or more user equipments, the report trigger condition based on the UE-specific biasing adjustment parameters in view of a common biasing parameter of the current eNB about cell range expansion of the target eNB.

12. The method according to claim 10, wherein the method further comprises:
  sending, by the current eNB, the UE-specific biasing adjustment parameters to the target eNB;
  adjusting, based on the UE-specific biasing adjustment parameters, handover parameters about cell range expansion corresponding to the current eNB.

* * * * *